(12) United States Patent
Brandt

(10) Patent No.: US 6,332,071 B1
(45) Date of Patent: Dec. 18, 2001

(54) INTEGRATED ANTENNA SWITCH HAVING AMPLIFIER

(75) Inventor: Per-Olof Brandt, Staffanstorp (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/287,564

(22) Filed: Apr. 6, 1999

(30) Foreign Application Priority Data

Apr. 7, 1998 (SE) .................................................. 9801209

(51) Int. Cl.[7] .................................................... H04B 1/44
(52) U.S. Cl. ................................ 455/82; 455/83; 333/101
(58) Field of Search ......................... 455/78, 82, 83, 455/84, 553, 572; 333/104, 262, 132, 167, 175, 101, 103, 126, 129, 134

(56) References Cited

U.S. PATENT DOCUMENTS

| | | | |
|---|---|---|---|
| 5,507,011 | * | 4/1996 | Chigodo et al. ........................ 455/82 |
| 5,584,053 | * | 12/1996 | Kommrusch et al. ................. 455/82 |
| 5,634,200 | * | 5/1997 | Kitakubo et al. ....................... 455/82 |

FOREIGN PATENT DOCUMENTS

| | | |
|---|---|---|
| 0 823 751 | 2/1998 | (EP) . |
| 97/10621 | 3/1997 | (WO) . |
| 97/32353 | 9/1997 | (WO) . |

* cited by examiner

Primary Examiner—Edward F. Urban
(74) Attorney, Agent, or Firm—Burns, Doane, Swecker & Mathis, L.L.P.

(57) ABSTRACT

An antenna switch includes at least one signal path, including an amplifier device and a switch. The amplifier device includes an amplifier connected to a first inductor and to a first capacitor, which is grounded. The amplifier is voltage supplied via a second inductor. The switch includes a receiving isolation device, which is connected to a bypass capacitor connected to an antenna via a low pass filter. A first microstrip is connected to the bypass capacitor and to a DC switch. The first inductor and the first capacitor together with a shorted output transistor of the amplifier form a high impedance in receiving mode, thereby not affecting the receiving signal. The receiving isolation device is a signal wire.

7 Claims, 7 Drawing Sheets

FIG. 7

INTEGRATED ANTENNA SWITCH HAVING AMPLIFIER

This application claims priority under 35 U.S.C. §§119 and/or 365 Application No. 9801209-9 filed in Sweden on Apr. 7, 1998; the entire content of which is hereby incorporated by reference.

FIELD OF THE INVENTION

The present invention relates to an antenna switch comprising at least one signal path, and more particularly to an integrated antenna switch having both amplifier means and switching means in each path.

BACKGROUND

Great efforts have been made to meet the requirements of performance and compactness of mobile and portable phones.

As the requirements for mobile phones of even smaller size increase, the requirements of better performance, more functions and services increase at the same time. Consequently, more and more components have to fit in on an even smaller area or space in the portable phone. An increased number of components also cause increased electrical losses.

Figure 1:
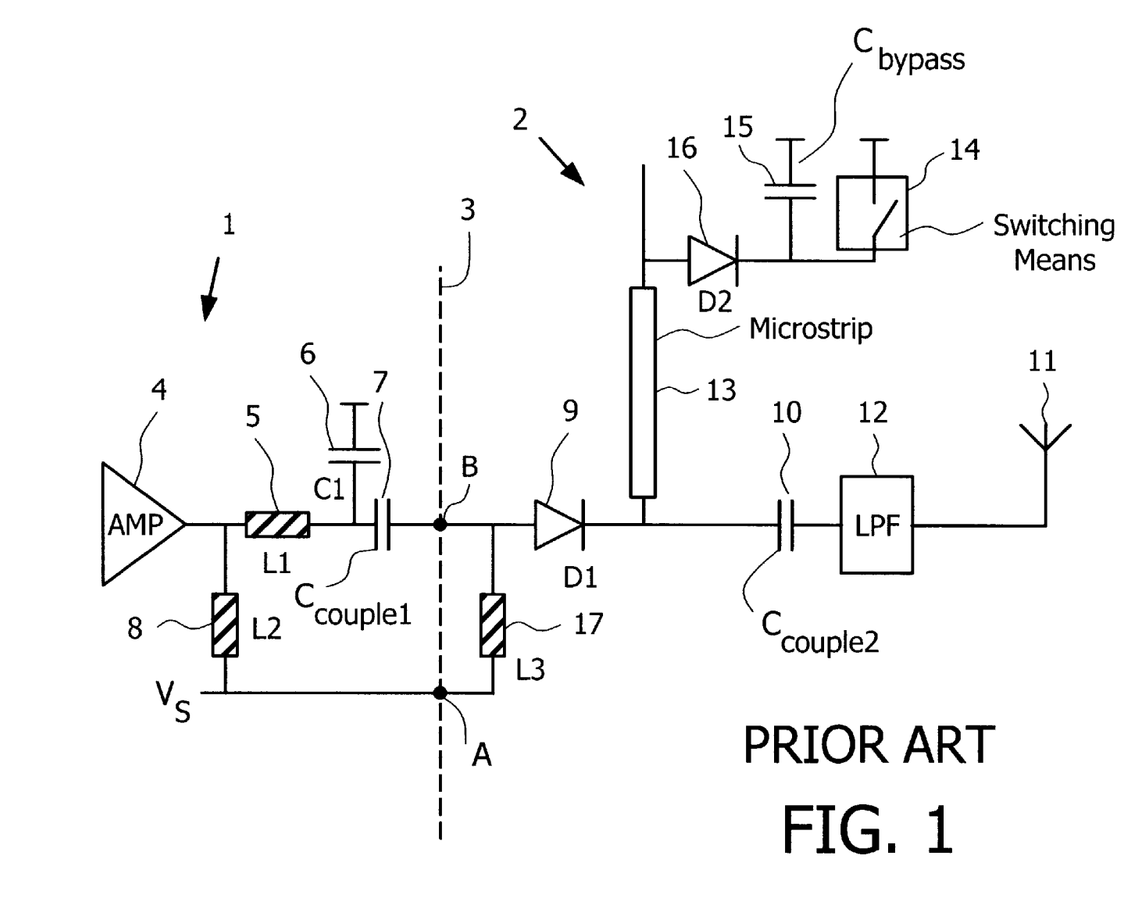
FIG. 1 is a block diagram of a prior art single band antenna switch.

Every mobile phone is provided with some kind of antenna switch for switching between transmitting and receiving of signals using at least one antenna. Prior known antenna switch stages are divided in two separate substeps or components. The first step is an amplifier step which is connected to the successive switching step. FIG. 1 shows a prior art single band antenna switch, comprising an amplifier component and a switching component both components including several bulky components, such as inductors, PIN diodes, capacitors and filters, which cause losses in the switch. Particularly, this is more apparant in a dual band system having another signal path.

SUMMARY

It is therefore an object of the present invention to provide an improved antenna switch which reduces the above-mentioned problems with several bulky components causing losses in the system.

The object of the present invention of reducing the number of components in the switch is obtained by an integrated antenna switch component having both amplifier means and switching means in each path.

Further, in order to reduce the required component area a microstrip is used as impedance means in the antenna switch and suitable adjustment of other components in the switch is performed.

In the integrated antenna switch the switching means is supplied by the same DC-feed as the power amplifiers, wherein components such as inductors and capacitors become unnecessary for the function of the antenna switch and are removed.

In order to connect two signal paths of a dual band antenna switch to the same antenna both paths are connected to the antenna through frequency band selecting means such as a diplexer.

The number of components is even more reduced by removing the low pass filter in each path and attaching the low pass filter between the diplexer and the antenna.

The diplexer is designed to let through only high band signals in the high band path and prevent low band signals to leak into the high band path. Similarly, the low band path lets through low band signals and prevents high band signals to leak into the low band path.

The advantages of the present invention is that the number of components used in the antenna switch is reduced and a reduction of losses in the transmission is obtained.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION

With reference to FIG. 1, a prior art single band antenna switch is illustrated, comprising amplifier means 1 and switching means 2, which are two separate components, as is illustrated by a broken line 3 between the two components 1 and 2. Further, the two components 1 and 2 are attached to each other at first and second connection points A and B.

Said amplifier means comprises a first amplifier 4, the output terminal of which is connected to a first terminal of a first inductor 5. A second terminal of said inductor 5 is connected to a first terminal of a first capacitor 6, a second terminal of which is grounded. A first bypass capacitor 7 constitutes the output from the amplifier means. Further, the amplifier 4 is fed by supply voltage $V_s$ via a first high value inductor 8, as shown in FIG. 1.

Said switching means 2 comprises first receiving isolation means 9, such as a PIN diode, for isolation of the power amplifier 4 from the receiving branch, described later, and for switching off the power when very little output power is transmitted. An output terminal of said receiving isolation means 9 is connected to a first terminal of a second bypass capacitor 10, a second terminal of which is connected to an antenna 11 via a low pass filter 12. Said second bypass capacitor 10 is provided to protect the switch and amplifier from discharges in the antenna. A microstrip 13, e.g. ¼ of the wave length in the band, is connected to said first terminal of said second bypass capacitor 10.

First DC switching means 14 are provided in order to switch between transmitting mode and receiving mode. Said DC switching means are connected in one end to the ground and in another end to a third bypass capacitor 15, also connected to the ground. The junction between said third bypass capacitor 15 and said DC switching means 14 is connected to an output of a second PIN diode 16, an input terminal of which is connected to the microstrip 13.

Figure 2:
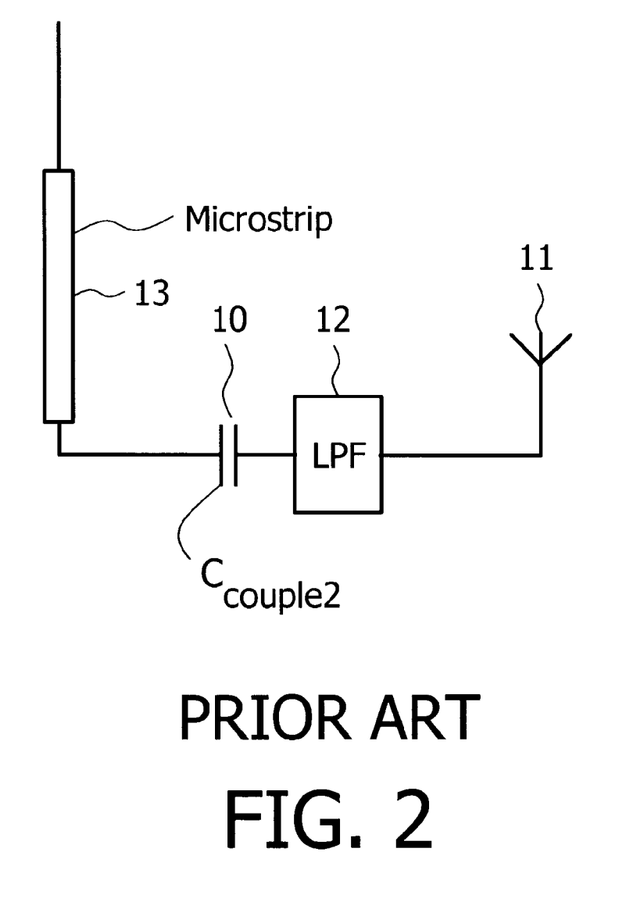
FIG. 2 is an equivalent circuit for the receiving path of the antenna switch in FIG. 1.

In the receiving mode, said DC switching means 14 is switched off, i.e. opened, wherein the first and second PIN diodes 9 and 16 are off and consequently present a high impedance. An equivalent circuit of the receiving path comprising the antenna 11, the low pass filter 12, the capacitor 10, and the microstrip 13 connected to the receiving input terminal of the phone, in which the antenna switch is arranged, is shown in FIG. 2. The low pass filter 12 is intended to attenuate harmonic frequencies, the capacitor 10 is a bypass capacitor not letting through radio frequency signals, and the microstrip 13 is a 50 Ohm transmission line.

Figure 3:
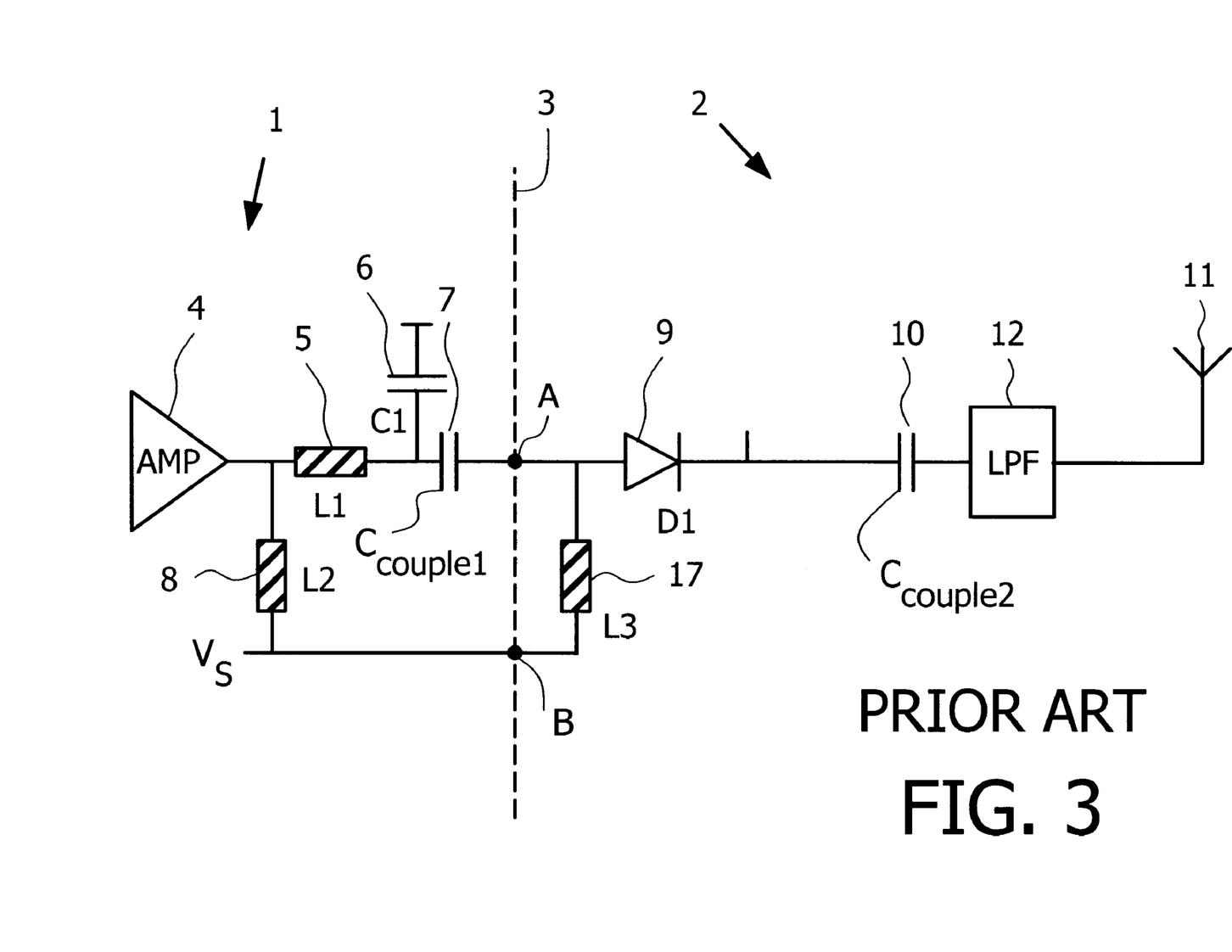
FIG. 3 is an equivalent circuit of the transmitting path of the antenna switch in FIG. 1.

FIG. 3 is an equivalent circuit illustrating the prior art antenna switch in transmitting mode. The transmitting path comprises the power amplifier 4, the inductor 5, the capacitor 6, the bypass capacitor 7, the PIN diode 9, the bypass capacitor 10, the low pass filter 12 and the antenna 11. In this mode the PIN diodes 9 and 16 are short circuited and the bond wires in the PIN diode packages are still there and therefore the capacitor 15 can be used to get a series resonance with the inductance of the bond wires in the package of the PIN diode 16. As the microstrip 13 is ¼ of the wave length, the low impedance at the receiving input terminal is transformed to a high impedance for transmitting signals. Thus, the transmitting path looks like the equivalent circuit as shown in FIG. 3.

The inductor 8 in the amplifier component 1 as well as a second high value inductor 17 in the switching component 2 are RF chokes used not to attenuate the RF-signal. The power amplifier 4 has an output of for example 2 W in GSM. The inductor 5 and the capacitor 6 are impedance matching components. Further, the capacitor 7 is a bypass capacitor. In the transmitting mode the PIN diode 9 is biased through the DC switching means 14 and the microstrip 13, shown in FIG. 1. The PIN diode 9 then acts almost as a short circuit. The capacitor 10 is also a bypass capacitor and the low pass filter 12 attenuates harmonic frequencies.

As illustrated in FIGS. 1–3 the prior art single band amplifier component 1 and switching component 2 are two separate components connected together. On the contrary the antenna switch according to the invention is an integrated antenna switch having both amplifier means and switching means in each path, as illustrated in FIG. 4.

Figure 4:
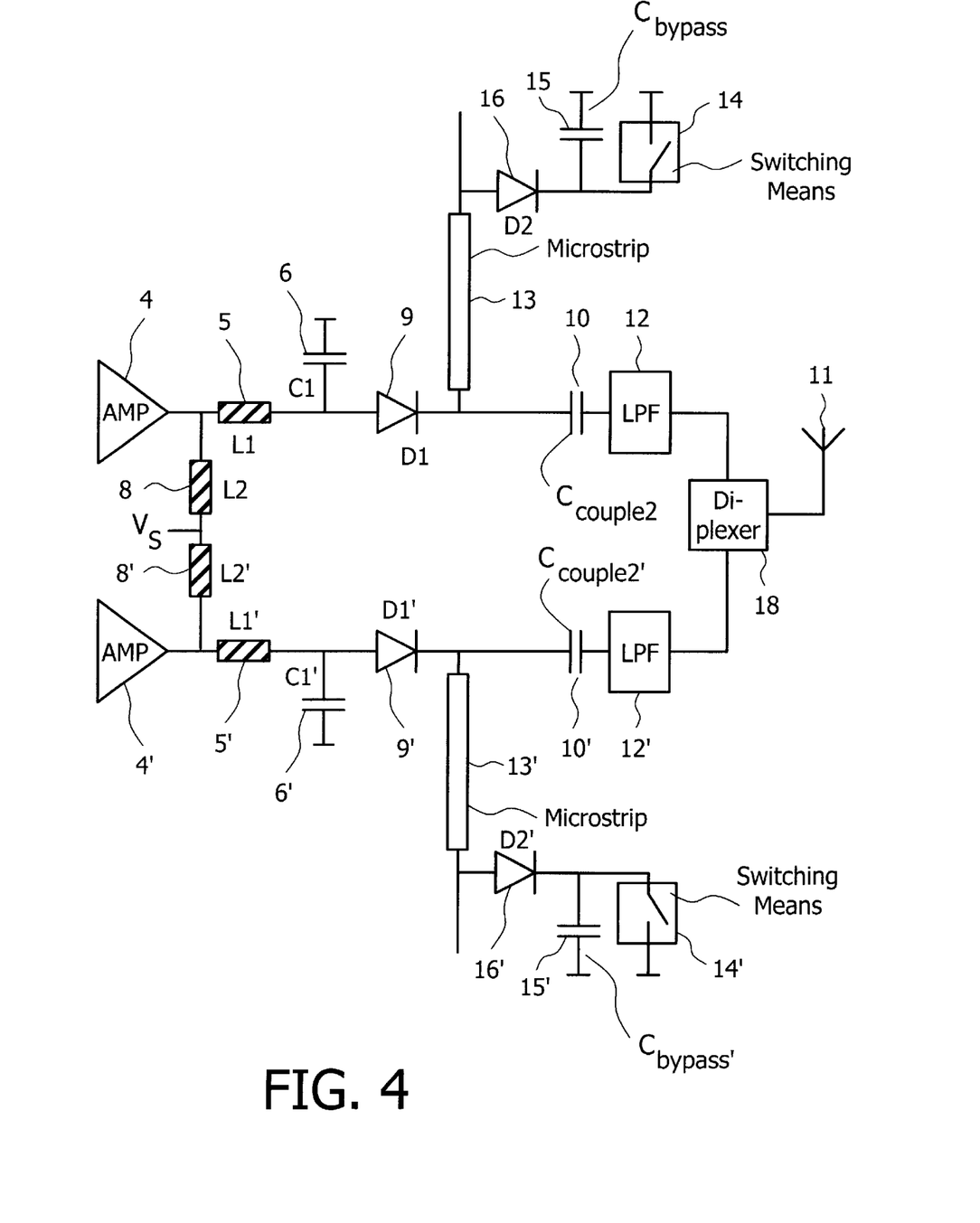
FIG. 4 is an embodiment of a dual band antenna switch according to the invention, wherein a high band path and a low band path are connected to an antenna via frequency band selecting means.

FIG. 4 illustrates an integrated dual band antenna switch according to an embodiment of the present invention having two single paths connected together via frequency selecting means such as a diplexer 18, said antenna switch being an integrated antenna switch having both amplifier means and switching means in each path. The upper path in FIG. 4 is the high band path and the lower path is the lower band path.

According to the invention the integrated antenna switch comprises, in the high band path, the first amplifier 4, the output terminal of which is connected to the first terminal of the first inductor 5. The second terminal of said inductor 5 is connected to the first terminal of the first capacitor 6, a second terminal of which is grounded. Further, the amplifier 4 is fed by supply voltage $V_s$ via the first high value inductor 8.

The second terminal of said inductor 5 and the first terminal of the first capacitor 6 is connected to the first receiving isolation means 9. The output terminal of said receiving isolation means 9 is connected to the first terminal of the second bypass capacitor 10, the second terminal of which is connected to the low pass filter 12, which is connected to the antenna 11 via the diplexer 18. The microstrip 13, e.g. ¼ of the wave length in the high band, is connected to said first terminal of said second bypass capacitor 10.

Similar to the prior art switch, DC switching means 14 is provided in order to switch between transmitting mode and receiving mode. Said DC switching means is connected in one end to the ground and in the other end to the third bypass capacitor 15, also connected to the ground. A junction between said third bypass capacitor 15 and said DC switching means 14 is connected to the output of said second PIN diode 16, the input terminal of which is connected to the microstrip 13.

The control signal in the antenna switch depends on how the DC switch 14 is set, on or off, similar to the single band antenna switch described above. However, in this embodiment of the invention the DC feed is provided by the same supply, $V_s$, as for the power amplifier 4. This is a more compact solution requiring fewer components than the prior art solution described in FIG. 1, wherein the switching means is provided with the bypass capacitor 7 on its output and the DC supply for the antenna switch PIN diodes 9 and 16 are supplied through the choke inductor 17.

In the low band path, a second amplifier 4', an output terminal of which is connected to a first terminal of a second inductor 5'. A second terminal of said inductor 5' is connected to a first terminal of a second capacitor 6', a second terminal of which is grounded. Further, the amplifier 4' is fed by the supply voltage $V_s$, the same as for the high band path, via a third high value inductor 8'.

The second terminal of said inductor 5' and the first terminal of the capacitor 6' is connected to second receiving isolation means 9'. An output terminal of said receiving isolation means 9' is connected to a first terminal of a fourth bypass capacitor 10', a second terminal of which is connected to a second low pass filter 12', which is connected to the antenna 11 via the diplexer 18. A first microstrip 13', e.g. ¼ of the wave length in the low band, is connected to said first terminal of said fourth bypass capacitor 10'.

In the same way as for the high band path second DC switching means 14' is provided in the low band path in order to switch between transmitting mode and receiving mode. Said DC switching means 14' is connected in one end to the ground and in the other end to a fifth bypass capacitor 15', also connected to the ground. A junction between said bypass capacitor 15' and said DC switching means 14' is connected to the output of a fourth PIN diode 16', an input terminal of which is connected to the microstrip 13'.

Figure 5:
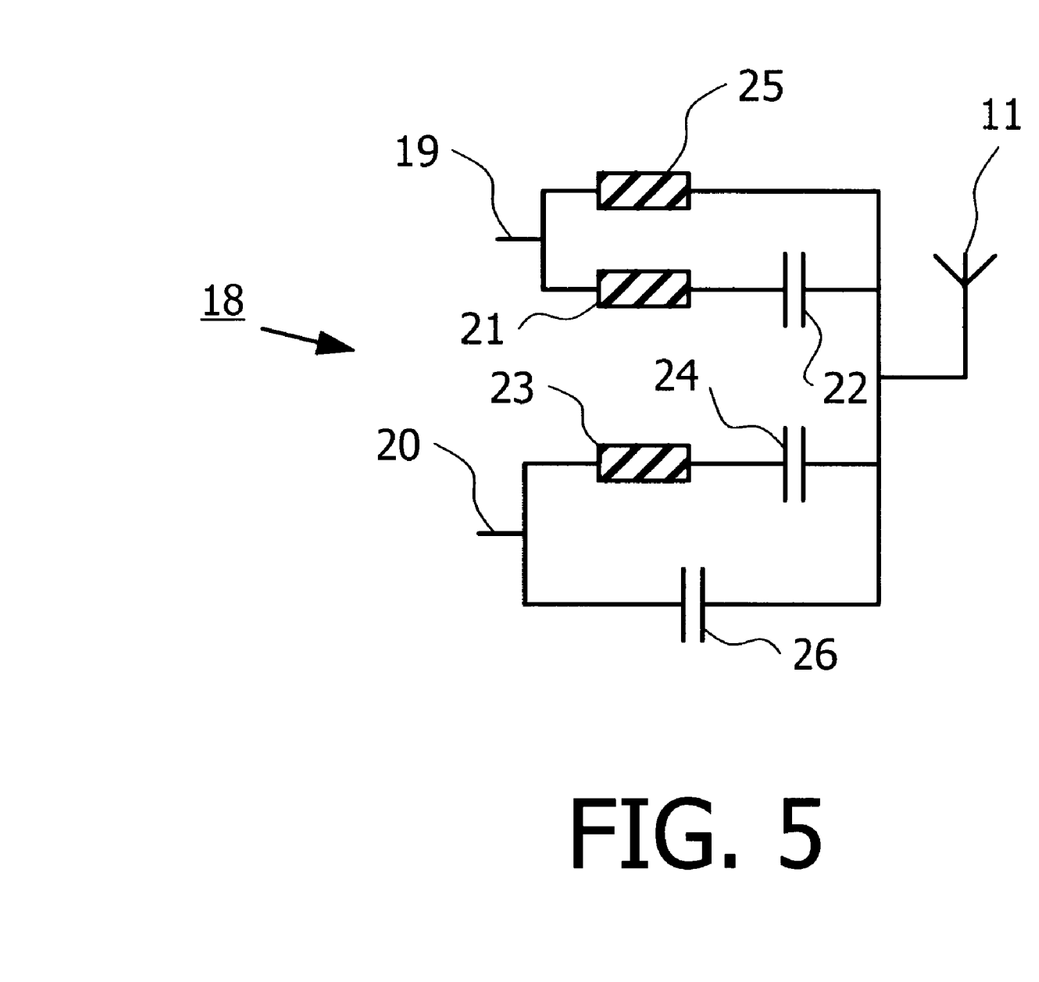
FIG. 5 is a detailed block diagram over the frequency selecting means in FIG. 4.

One embodiment of the diplexer 18 connecting the two signal paths for frequency band selecting is illustrated in FIG. 5. The diplexer 18 has high band means or a path 19 and low band means or a path 20. The high band means comprises a third inductor 21, connected in series with a third capacitor 22 forming a series resonance circuit letting through only high band signals, for example 1800 MHz. Similarly, the low band means 20 comprises a fourth inductor 23 forming a series resonance circuit with a fourth capacitor 24. To prevent low band signals from leaking into the high band path 19 a fifth inductor 25 is arranged in parallel with the capacitor 22. To prevent high band signals from leaking into the low band path 20 the inductor 22 is arranged in parallel with a fifth capacitor 26.

With reference to FIG. 4, the PIN diode 9,9' causes loss in the transmitting mode. Therefore, the inductor 5,5' and the capacitor 6,6' are selected in a way that they "look" like a high impedance together with an output transistor, not shown, of the amplifier 4,4' and thereby do not affect the receiving signal when the phone is in the receiving mode. This is performed by shorting the output transistor. The output of the power amplifier 4,4' then is a low impedance, almost like a short circuit, wherein of course the supply $V_s$ also has to be switched off. The inductor 5,5' and the capacitor 6,6' are almost in parallel resonance at the carrier frequency.

Figure 6:
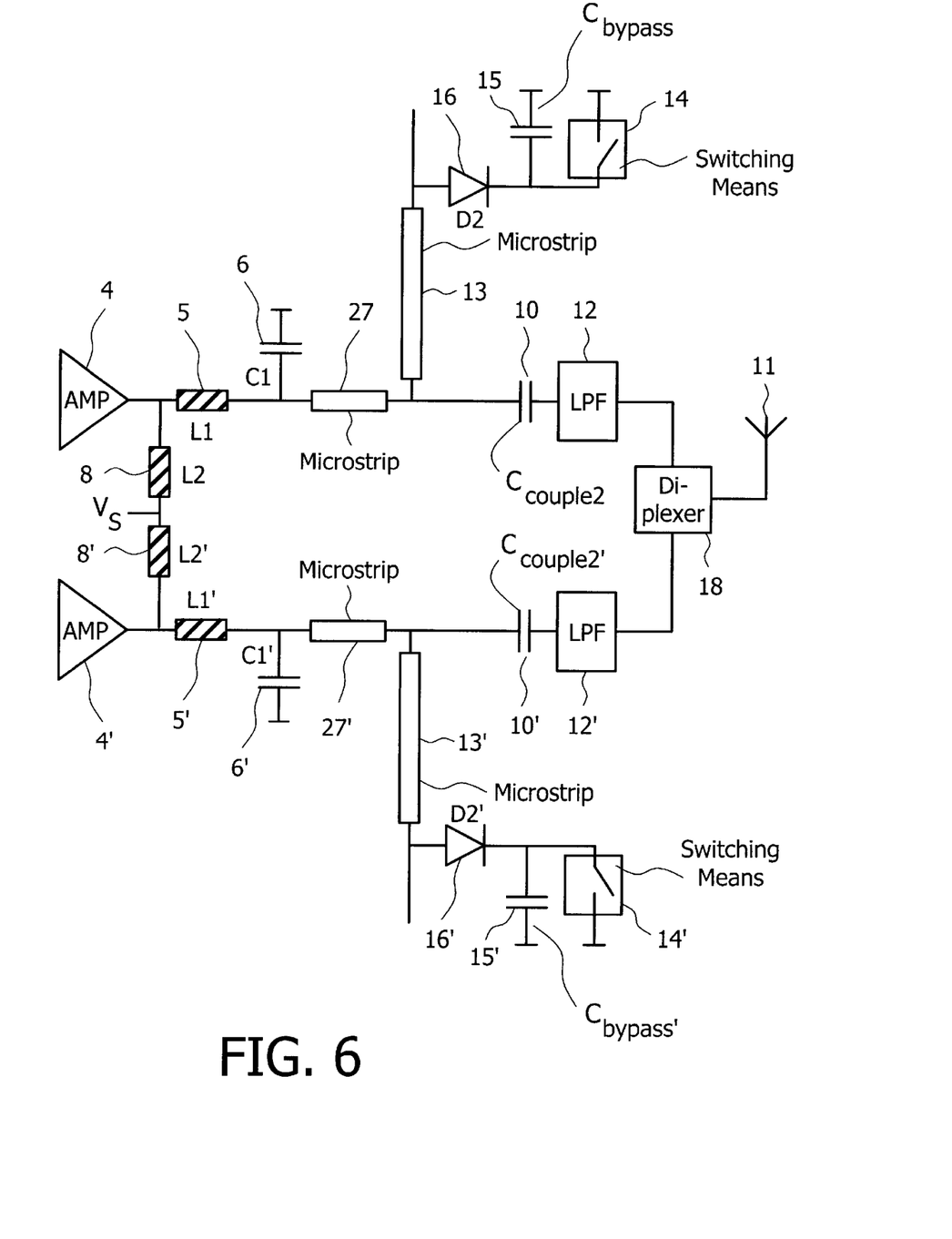
FIG. 6 is an alternative embodiment of the dual band antenna switch according to the invention.

In an alternative embodiment of the invention illustrated in FIG. 6, the PIN diod 9,9' has been substituted by a second microstrip 27,27' for fine tuning, to make the impact from the power amplifier 4,4' at a minimum on the receiving signal attenuation. However, if the inductor 5,5' and the capacitor 6,6' are in parallel resonance at the carrier frequency the microstrip 27,27' is not needed.

In another alternative embodiment of the invention or as a complement, a first matching impedance can be connected to the first microstrip 13,13' and the DC switching means 14,15,16;14',15',16', forming an impedance value of the same value as is present when "looking" into said first capacitor 6,6' and said first inductor 5,5', if they are not exactly in resonance.

In still another embodiment of the invention the output transistor can be left open and instead of said first matching impedance a second matching impedance can be connected to the first microstrip 13,13' and the DC switching means 14,15,16;14',15',16', forming an impedance value of the same value as is present when "looking" into said first capacitor 6,6' and said first inductor 5,5'.

Also, the second microstrip 27,27' can be provided for fine tuning, to make the impact from the power amplifier 4,4' at a minimum on the receiving signal attenuation.

Hence, the amplifier means is either a high impedance or is acting as a component value in a filter configuration in the receiving path.

Thus, it should be apparent that the present invention provides an antenna switch that fully satisfies the aims and advantages set forth above. Although the invention has been described in conjunction with a specific embodiment and an alternative embodiment thereof, alternatives, modifications and variations are apparent to those skilled in the art.

Figure 7:
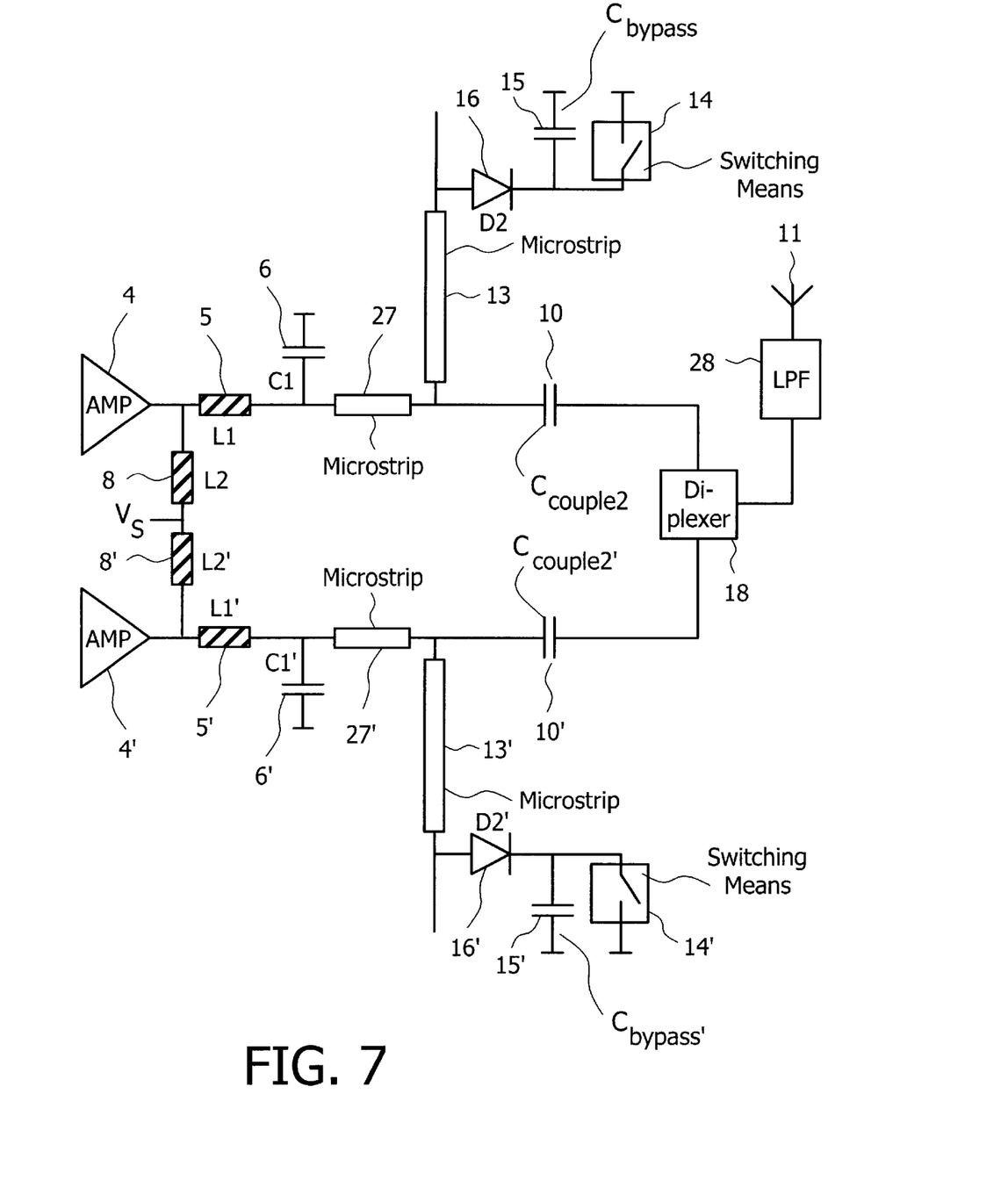
FIG. 7 is another alternative embodiment of the dual band antenna switch according to the invention.

For example, further improvements in component reduction is shown by another alternative embodiment in FIG. 7. The low pass filters 12 and 12' in the dual band antenna switch design in FIG. 6 have been removed and another low pass filter 28 is arranged between the diplexer 18 and the antenna 11 for attenuating the harmonics, in both the high and low bands.

What is claimed is:

1. An antenna switch comprising at least one signal path, including amplifier means coupled to respective switching means, said amplifier means comprising an amplifier having an output terminal that is connected to a first terminal of a first inductor, a second terminal of the first inductor being connected to a first terminal of a first capacitor, a second terminal of the first capacitor being grounded, said amplifier being voltage supplied via a choke inductor, said switching means comprising receiving isolation means having an input terminal connected to the second terminal of the first inductor and to the first terminal of the first capacitor, and an output terminal which is connected to a first terminal of a coupling capacitor, the second terminal of the coupling capacitor being connected to an antenna via a low pass filter, and a first microstrip having a first terminal connected to said first terminal of the coupling capacitor and to the output terminal of the receiving isolation means, and a second terminal connected to DC switching means, wherein said first inductor and said first capacitor together with a shorted output transistor of said amplifier form a high impedance in a receiving mode, thereby not affecting the receiving signal in the receiving mode, and said receiving isolation means is a signal wire.

2. A multi band antenna switch according to claim 1, further comprising a matching impedance connected to the second terminal of the first microstrip and the DC switching means, forming an impedance having a value corresponding to an impedance value measured at the connection point of the first inductor and the first capacitor.

3. An antenna switch according to claim 1, wherein said receiving isolation means is a second microstrip for fine tuning, connected to said first inductor.

4. An antenna switch according to claim 1, wherein two signal paths are connected to the antenna through frequency band selecting means, comprising a high band means and low band means, said high band means including a third inductor in series with a third capacitor, letting through high band signals, connected to the antenna, and a fifth inductor in parallel with said third inductor and said third capacitor, preventing low band signals from leaking through, and said low band means including a fourth inductor in series with a fourth capacitor, connected to the antenna, letting through low band signals, and a fifth capacitor in parallel with said fourth inductor and said fourth capacitor, preventing high band signals from leaking through.

5. A multi band antenna switch according to claim 4, wherein said low pass filter is connected between said frequency band selecting means and said antenna.

6. An antenna switch comprising at least one signal path, including amplifier means coupled to respective switching means, said amplifier means comprising an amplifier, an output terminal of which is connected to a first terminal of a first inductor and a second terminal of which is connected to a first terminal of a first capacitor, a second terminal of which is grounded, said amplifier being voltage supplied via a choke inductor, and said switching means comprising receiving isolation means, which output terminal is connected to one terminal of a bypass capacitor, connected to an antenna via a low pass filter, and a first microstrip, an input terminal of which is connected to a first terminal of said bypass capacitor and an output terminal of which is connected to DC switching means, wherein said first inductor and said first capacitor together with a shorted output transistor of said amplifier form a high impedance in receiving mode, thereby not affecting the receiving signal in receiving mode, and said receiving isolation means is a signal wire.

7. An antenna switch comprising at least one signal path, including amplifier means coupled to respective switching means, said amplifier means comprising an amplifier, an output terminal of which is connected to a first terminal of a first inductor and a second terminal of which is connected to a first terminal of a first capacitor, a second terminal of the first capacitor being grounded, said amplifier being voltage supplied via a choke inductor, said switching means comprising receiving isolation means having an input terminal connected to the second terminal of the first inductor and to the first terminal of the first capacitor, and an output terminal that is connected to a first terminal of a coupling capacitor, a second terminal of the coupling capacitor being connected to an antenna via a low pass filter, and a microstrip, an input terminal of which is connected to the first terminal of said coupling capacitor and an output terminal of which is connected to DC switching means, the antenna switch further comprising a matching impedance connected to the output terminal of the microstrip and the DC switching means, such that the matching impedance, microstrip, and DC switching means together form an impedance having a value corresponding to an impedance value measured at the connection of the first inductor and the first capacitor.

* * * * *